US012591657B2

(12) United States Patent
Zhang et al.

(10) Patent No.: US 12,591,657 B2
(45) Date of Patent: Mar. 31, 2026

(54) METHOD FOR ACQUIRING IDENTITY AUTHENTICATION INFORMATION, APPARATUS, STORAGE MEDIUM AND SYSTEM

(71) Applicant: Hangzhou AliCloud Feitian Information Technology Co., Ltd., Hangzhou City (CN)

(72) Inventors: Zhang Zhang, Hangzhou (CN); Tongfei Chang, Hangzhou (CN); Fang Zheng, Hangzhou (CN); Yinsuo Mu, Hangzhou (CN); Yuchen Zhang, Hangzhou (CN)

(73) Assignee: Hangzhou AliCloud Feitian Information Technology Co., Ltd., Hangzhou City (CN)

( * ) Notice: Subject to any disclaimer, the term of this patent is extended or adjusted under 35 U.S.C. 154(b) by 0 days.

(21) Appl. No.: 18/697,910

(22) PCT Filed: Feb. 2, 2023

(86) PCT No.: PCT/CN2023/074220
§ 371 (c)(1),
(2) Date: Apr. 2, 2024

(87) PCT Pub. No.: WO2023/151505
PCT Pub. Date: Aug. 17, 2023

(65) Prior Publication Data
US 2025/0139224 A1     May 1, 2025

(30) Foreign Application Priority Data
Feb. 14, 2022     (CN) .......................... 202210131668.4

(51) Int. Cl.
*G06F 21/44* (2013.01)
*G16Y 30/10* (2020.01)
*H04L 9/30* (2006.01)

(52) U.S. Cl.
CPC ............ *G06F 21/445* (2013.01); *G16Y 30/10* (2020.01); *H04L 9/30* (2013.01)

(58) Field of Classification Search
CPC ....... G06F 21/445; G06F 21/44; G16Y 30/10; H04L 9/30
See application file for complete search history.

(56) References Cited

U.S. PATENT DOCUMENTS

2011/0271099 A1* 11/2011 Preiss ................. H04L 63/0807
726/4
2013/0205277 A1* 8/2013 Seven ................. G06F 9/44536
717/121
(Continued)

FOREIGN PATENT DOCUMENTS

CN        101621434 A        1/2010
CN        105897663 A        8/2016
(Continued)

OTHER PUBLICATIONS

China National Intellectual Property Administration; International Search Report and Written Opinion issued in PCT App. No. PCT/CN2023/074220 dated Apr. 26, 2023; 13 pages.
(Continued)

*Primary Examiner* — Robert B Leung
*Assistant Examiner* — Howard H. Louie
(74) *Attorney, Agent, or Firm* — Maschoff Brennan

(57) ABSTRACT
A method for acquiring identity authentication information, an apparatus, a storage medium and a system. The method includes: receiving a request message from an Internet of Things device, where the request message is used for
(Continued)

Sending a request message to a first server, where the request message is used for requesting to acquire identity authentication information, and the identity authentication information is applied for and obtained by the first server from a second server, where the first server is used for acquiring the identity authentication information from the second server in place of an Internet of Things device and managing the identity authentication information, and the second server is used for providing a target cloud service corresponding to the identity authentication information — S502

Receiving the identity authentication information returned by the first server — S504

Accessing the second server by using the identity authentication information — S506 requesting to acquire identity authentication information, and the identity authentication information is applied for and obtained by a first server from a second server, where the first server is used for acquiring the identity authentication information from the second server in place of the Internet of Things device and managing the identity authentication information, and the second server is used for providing a target cloud service corresponding to the identity authentication information; returning the identity authentication information to the Internet of Things device in response to the request message, to enable the Internet of Things device to access the second server by using the identity authentication information.

15 Claims, 8 Drawing Sheets

(56) References Cited

U.S. PATENT DOCUMENTS

| | | | | |
|---|---|---|---|---|
| 2017/0316400 A1* | 11/2017 | Venkatakrishnan | ..................... | |
| | | | | G06Q 20/3227 |
| 2018/0167367 A1* | 6/2018 | John | ................. | H04L 9/0825 |
| 2019/0342373 A1* | 11/2019 | Li | ..................... | H04L 12/66 |
| 2021/0306214 A1 | 9/2021 | Lane et al. | | |
| 2023/0342087 A1* | 10/2023 | He | ................. | G06F 13/1668 |

FOREIGN PATENT DOCUMENTS

| | | |
|---|---|---|
| CN | 107317674 A | 11/2017 |
| CN | 107317789 A | 11/2017 |
| CN | 111066284 A | 4/2020 |
| CN | 111355571 A | 6/2020 |
| CN | 112287393 A | 1/2021 |
| CN | 114168928 A | 3/2022 |
| JP | 20072999303 | 11/2007 |
| JP | 2013545195 | 12/2013 |

OTHER PUBLICATIONS

China National Intellectual Property Administration; First Office Action issued in CN App. No. 202210131668.4 dated Mar. 21, 2022; 18 pages.

Simplicio Jr., Marcos A. et al.; "The Unified Butterfly Effect: Efficient Security Credential Management Systems for Vehicular Communications"; presented at 2018 IEEE Vehicular Networking Conference; Dec. 5-7, 2018; 8 pages; DOI: 10.1109/VNC.2018. 8628369.

China National Intellectual Property Administration; Notification of Grant for CN App. No. 202210131668.4 dated Apr. 11, 2022; 3 pages.

Yao Qiang; "Research and Design of Third-Party Logistics Information Platform based on Spatial Information Technology"; China's Excellent Master's Thesis; Jul. 15, 2013; 79 pages, English Abstract.

* cited by examiner

Figure 2:
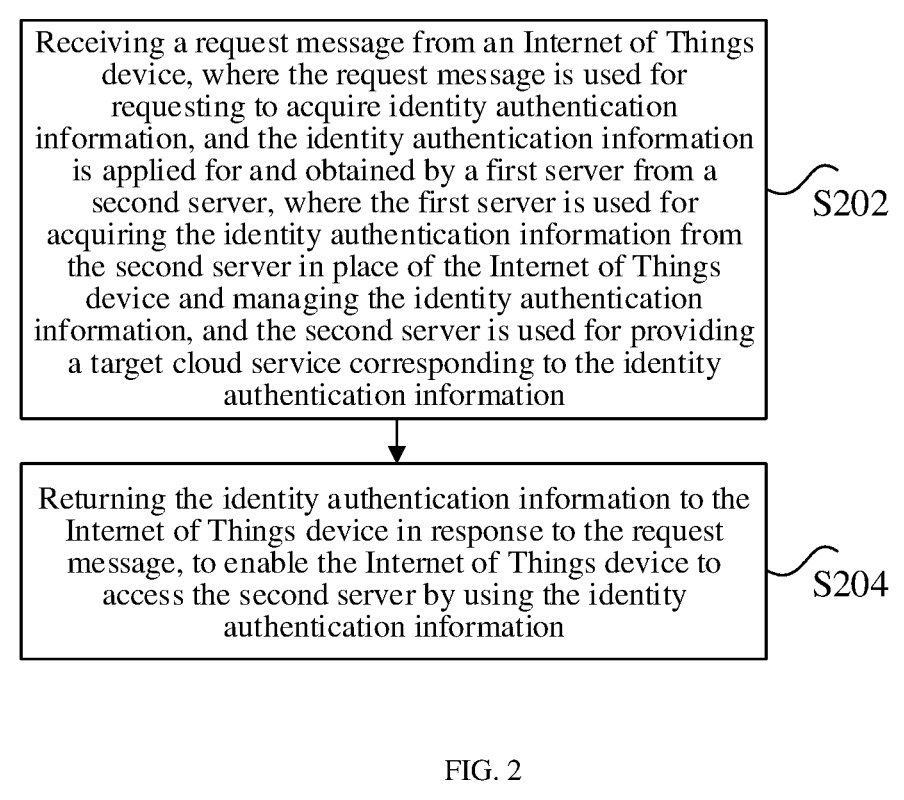

Receiving a request message from an Internet of Things device, where the request message is used for requesting to acquire identity authentication information, and the identity authentication information is applied for and obtained by a first server from a second server, where the first server is used for acquiring the identity authentication information from the second server in place of the Internet of Things device and managing the identity authentication information, and the second server is used for providing a target cloud service corresponding to the identity authentication information

S202

Returning the identity authentication information to the Internet of Things device in response to the request message, to enable the Internet of Things device to access the second server by using the identity authentication information

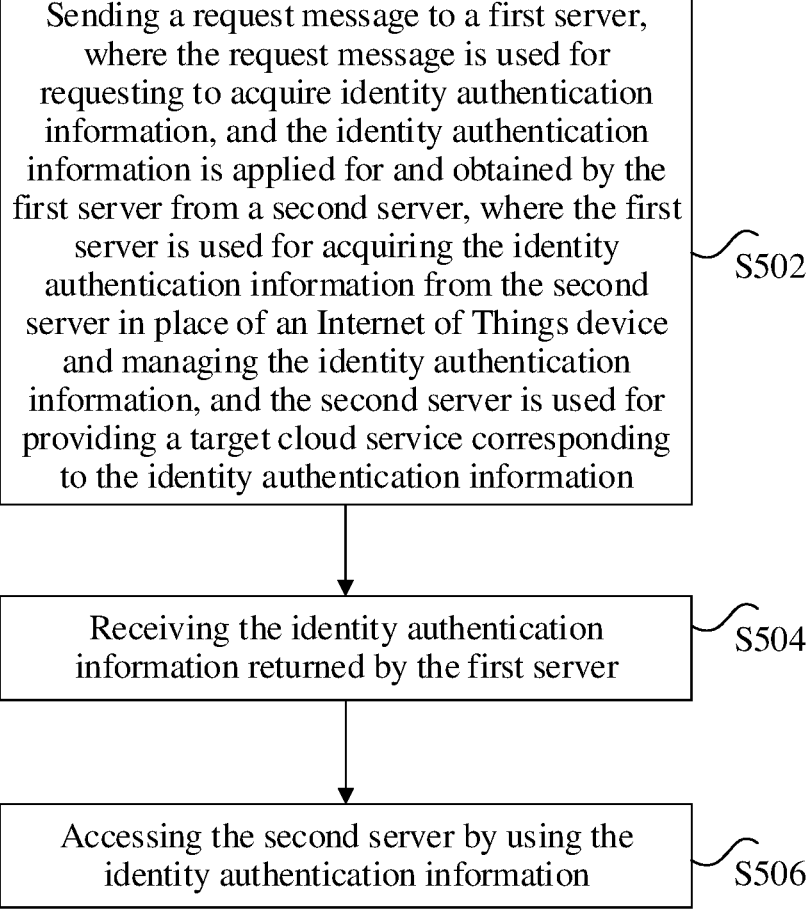

Sending a request message to a first server, where the request message is used for requesting to acquire identity authentication information, and the identity authentication information is applied for and obtained by the first server from a second server, where the first server is used for acquiring the identity authentication information from the second server in place of an Internet of Things device and managing the identity authentication information, and the second server is used for providing a target cloud service corresponding to the identity authentication information ⌇S502

Receiving the identity authentication information returned by the first server ⌇S504

Accessing the second server by using the identity authentication information ⌇S506

FIG. 5

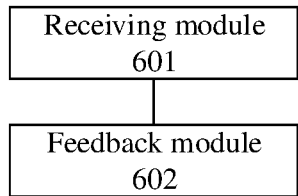

Receiving module
601

Feedback module
602

FIG. 6

METHOD FOR ACQUIRING IDENTITY AUTHENTICATION INFORMATION, APPARATUS, STORAGE MEDIUM AND SYSTEM

CROSS-REFERENCE TO RELATED APPLICATIONS

This application is a National Stage of International Application No. PCT/CN2023/074220, filed on Feb. 2, 2023, which claims priority to Chinese Patent Application No. 202210131668.4, filed to China National Intellectual Property Administration on Feb. 14, 2022 and entitled "METHOD FOR ACQUIRING IDENTITY AUTHENTI-CATION INFORMATION, APPARATUS, STORAGE MEDIUM AND SYSTEM". The afore-mentioned applications are hereby incorporated by reference in their entireties.

TECHNICAL FIELD

The present disclosure relates to the field of computer technologies and, in particular, to a method for acquiring identity authentication information, an apparatus, a storage medium and a system.

BACKGROUND

In Internet of Things related technologies, Internet of Things devices need to be authenticated to access corresponding Internet of Things management platforms. A common identity authentication method is to encrypt and verify triples (including a product identifier, a device identifier and a device secret key). This identity authentication method mainly includes the following two ways:

(1) "One device, one secret key" authentication: a unique triple is generated for each device: identity authentication is completed by verifying the triple. The disadvantage of this method is that the development complexity and cost are high.

(2) "One type, one secret key" authentication: the same product identifiers and device secret keys are preset for all devices of the same type, that is, in multiple triples corresponding to all devices of the same type, only the device identifiers are different, and the product identifiers and the device secret keys are the same: identity authentication is completed by verifying the triples. The disadvantage of this method is that because the product identifiers and the device secret keys are preset values, secondary development and management by users are not supported.

Therefore, how to acquire identity authentication information of the Internet of Things devices to reduce the development cost and the management cost has become a key issue. In view of the above problem, no effective solution has been put forward at present.

SUMMARY

Embodiments of the present disclosure provide a method for acquiring identity authentication information, an apparatus, a storage medium and a system, so as to at least solve the technical problem in the related art that development and management costs of a processing method using pre-generated triples as identity authentication information of Internet of Things devices are high.

According to an aspect of the embodiments of the present disclosure, a method for acquiring identity authentication information is provided, which includes: receiving a request message from an Internet of Things device, where the request message is used for requesting to acquire identity authentication information, and the identity authentication information is applied for and obtained by a first server from a second server, where the first server is used for acquiring the identity authentication information from the second server in place of the Internet of Things device and managing the identity authentication information, and the second server is used for providing a target cloud service corresponding to the identity authentication information; returning the identity authentication information to the Internet of Things device in response to the request message, to enable the Internet of Things device to access the second server by using the identity authentication information.

According to another aspect of the embodiments of the present disclosure, a method for acquiring identity authentication information is also provided, which includes: sending a request message to a first server, where the request message is used for requesting to acquire identity authentication information, and the identity authentication information is applied for and obtained by the first server from a second server, where the first server is used for acquiring the identity authentication information from the second server in place of an Internet of Things device and managing the identity authentication information, and the second server is used for providing a target cloud service corresponding to the identity authentication information: receiving the identity authentication information returned by the first server: accessing the second server by using the identity authentication information.

According to another aspect of the embodiments of the present disclosure, an apparatus for acquiring identity authentication information is also provided, which includes: a receiving module, configured to receive a request message from an Internet of Things device, where the request message is used for requesting to acquire identity authentication information, and the identity authentication information is applied for and obtained by a first server from a second server, where the first server is used for acquiring the identity authentication information from the second server in place of the Internet of Things device and managing the identity authentication information, and the second server is used for providing a target cloud service corresponding to the identity authentication information: a feedback module, configured to return the identity authentication information to the Internet of Things device in response to the request message, to enable the Internet of Things device to access the second server by using the identity authentication information.

According to another aspect of the embodiments of the present disclosure, an apparatus for acquiring identity authentication information is also provided, which includes: a sending module, configured to send a request message to a first server, where the request message is used for requesting to acquire identity authentication information, and the identity authentication information is applied for and obtained by the first server from a second server, where the first server is used for acquiring the identity authentication information from the second server in place of an Internet of Things device and managing the identity authentication information, and the second server is used for providing a target cloud service corresponding to the identity authentication information; a receiving module, configured to receive the identity authentication information returned by the first server; an accessing module, configured to access the second server by using the identity authentication information.

According to another aspect of the embodiments of the present disclosure, a storage medium is also provided. The storage medium includes a stored program, and when the program is run, a device where the storage medium is located is controlled to execute any one of the above methods for acquiring identity authentication information.

According to another aspect of the embodiments of the present disclosure, a system for acquiring identity authentication information is also provided, which includes: a processor; and a memory connected with the processor, configured to provide the processor with instructions for processing the following processing steps: receiving a request message from an Internet of Things device, where the request message is used for requesting to acquire identity authentication information, and the identity authentication information is applied for and obtained by a first server from a second server, where the first server is used for acquiring the identity authentication information from the second server in place of the Internet of Things device and managing the identity authentication information, and the second server is used for providing a target cloud service corresponding to the identity authentication information; returning the identity authentication information to the Internet of Things device in response to the request message, to enable the Internet of Things device to access the second server by using the identity authentication information.

In the embodiments of the present disclosure, when the Internet of Things device needs to access the second server providing the target cloud service, the identity authentication information needs to be acquired. Firstly, the Internet of Things device sends the request message for acquiring the identity authentication information, and the request message can be received by the first server. Then, the first server acquires the identity authentication information of the Internet of Things device from the second server in place of the Internet of Things device, and the first server can manage the identity authentication information and return the identity authentication information to the corresponding Internet of Things device. At this time, the Internet of Things device can use the identity authentication information to access the second server. Therefore, the embodiments of the present disclosure achieve the purpose of enabling the Internet of Things device to acquire the identity authentication information dynamically so that the Internet of Things device can access the Internet of Things management platform, thereby achieving the technical effect of reducing the development and management costs of the identity authentication process of the Internet of Things device, and further solving the technical problem in the related art that the development and management costs of the processing method using the pre-generated triples as the identity authentication information of the Internet of Things devices are high.

BRIEF DESCRIPTION OF DRAWINGS

The accompanying drawings illustrated here are used to provide a further understanding of the present disclosure and constitute a part of the present disclosure. The illustrative embodiments of the present disclosure and their descriptions are used to explain the present disclosure and do not constitute an undue limitation on the present disclosure. In the accompanying drawings:

FIG. 2 is a schematic flowchart of a method for acquiring identity authentication information provided by an embodiment of the present disclosure.

FIG. 5 is a schematic flowchart of another method for acquiring identity authentication information provided by an embodiment of the present disclosure.

FIG. 6 is a schematic structural diagram of an apparatus for acquiring identity authentication information provided by an embodiment of the present disclosure.

DESCRIPTION OF EMBODIMENTS

Figure 1:
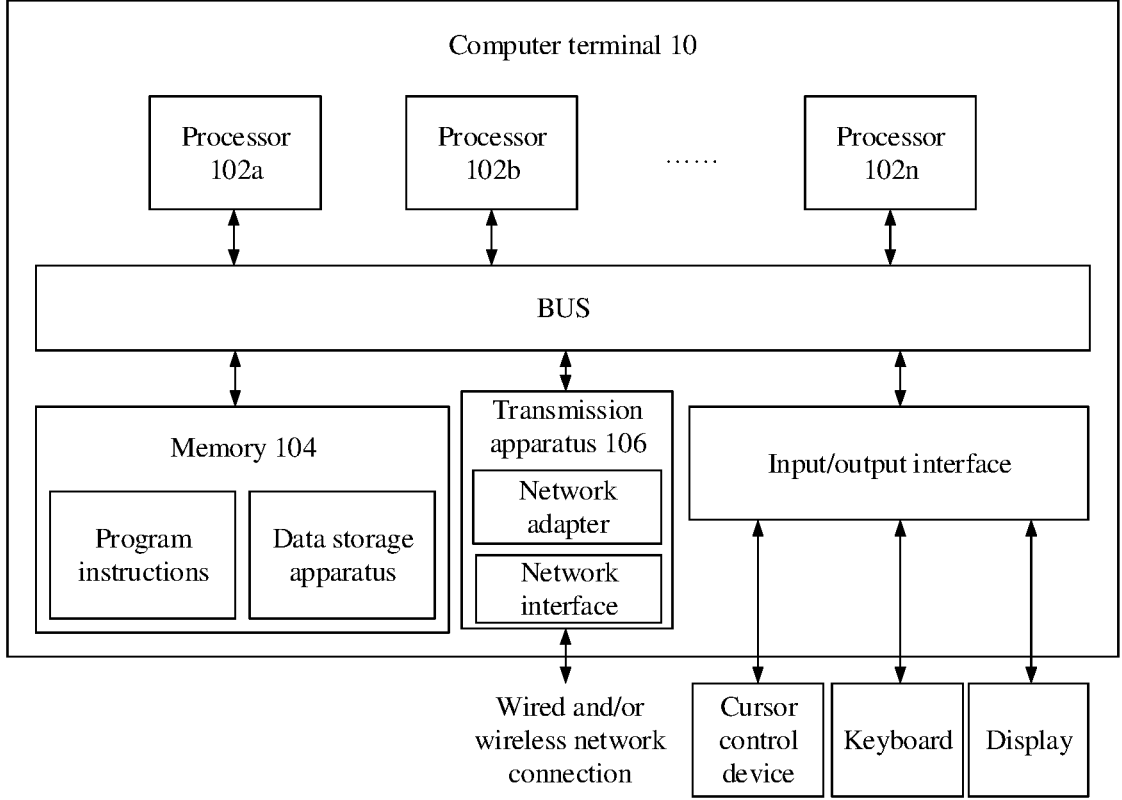
FIG. 1 illustrates a block diagram of a hardware structure of a computer terminal (or mobile device) for implementing a method for acquiring identity authentication information.

In order to make a person of ordinary skill in the art better understand the solutions of the present disclosure, the technical solutions in embodiments of the present disclosure will be described clearly and comprehensively with reference to the accompanying drawings. Apparently, the described embodiments are merely a part rather than all of the embodiments of the present disclosure. Other embodiments acquired by a person of ordinary skill in the art based on the embodiments of the present disclosure without paying creative efforts shall fall within the protection scope of the present disclosure.

It should be noted that the terms "first", "second" and the like in the description, claims and the above drawings of the present disclosure are used to distinguish similar objects, and are not necessarily used to describe a specific order or sequence. It should be understood that the terms thus used are interchangeable under appropriate circumstances, so that the embodiments of the present disclosure described herein can be implemented in other orders than those illustrated or described herein. In addition, the terms "including" and "having" and any variations thereof are intended to cover non-exclusive inclusion, for example, processes, methods, systems, products or devices containing a series of steps or units are not necessarily limited to those explicitly listed, but may include other steps or units not explicitly listed or inherent to these processes, methods, products or devices.

First of all, some nouns or terms appearing in the process of describing the embodiments of the present disclosure are applicable to the following explanations.

Internet of Things (IoT): collecting any object or process that needs video acquisition, connection and interaction in real time through various apparatuses and technologies such as information sensors, radio frequency identification technology, global positioning systems, infrared sensors, laser scanners, to collect all kinds of needed information thereof, such as sound, light, heat, electricity, mechanics, chemistry, biology, location, etc., realizing ubiquitous connection between things and things and between things and people through all kinds of possible network access, and realizing intelligent perception, identification and management of goods and processes. Product identifier (Product Key): an identity document (Identity Document, ID), which is used for indicating product information (such as a name, a place of origin, a manufacturer, a specification and model, etc.). A product identifier can be randomly generated by an Internet of Things management platform when creating a product.

Device identifier (Device Name): corresponding to a device, that is, each device having a unique device identifier. The device identifier can be customized by a user.

Device secret key (Device Secret): a secret key corresponding to a device, which is a proof of whether the device is authorized, and can be used for confirming the identity of the device and having the device access the management platform. The device secret key can be randomly generated by the Internet of Things management platform after the device is created, and cannot be reset after being generated.

Embodiment 1

According to an embodiment of the present disclosure, a method embodiment for acquiring identity authentication information is also provided. It should be noted that the steps shown in the schematic flowcharts of the accompanying drawings can be executed in a computer system such as a set of computer-executable instructions, and although logical orders are shown in the flowcharts, in some cases, the steps shown or described can be executed in a different order from here.

The method embodiment provided by Embodiment 1 of the present disclosure can be executed in a mobile terminal, a computer terminal or a similar computing apparatus. FIG. 1 illustrates a schematic diagram of a hardware structure of a computer terminal (or mobile device) for implementing a method for acquiring identity authentication information. As shown in FIG. 1, a computer terminal 10 (or mobile device 10) may include one or more (illustrated by 102*a*, 102*b*, . . . , 102*n* in FIG. 1) processors 102 (processors 102 may include but are not limited to processing apparatuses such as a microprocessor MCU or a programmable logic device FPGA, etc.), a memory 104 for storing data, and a transmission apparatus 106 for communication functions. In addition, it may also include a display, an input/output interface (I/O interface), a universal serial bus (USB) port (which may be included as one of ports of the BUS), a network interface, a power supply and/or a camera. It can be understood by a person skilled in the art that the structure shown in FIG. 1 is only schematic and does not limit the structure of the above electronic apparatus. For example, the computer terminal 10 may also include more or fewer components than those shown in FIG. 1, or have a different configuration from that shown in FIG. 1.

It should be noted that the one or more processors 102 and/or other data processing circuit(s) described above may generally be referred to herein as a "data processing circuit". The data processing circuit can be fully or partially embodied as software, hardware, firmware or any other combination. In addition, the data processing circuit may be a single independent processing module, or be fully or partially incorporated into any one of other elements in the computer terminal 10 (or mobile device). As involved in the embodiment of the present disclosure, the data processing circuit serves as processor control (such as selection of a terminal path of a variable resistor connected to an interface).

The memory 104 can be used for storing software programs and modules of application software, such as program instructions/data storage apparatus corresponding to the method for acquiring identity authentication information in the embodiment of the present disclosure. The processors 102 execute various functional applications and data processing by running the software programs and modules stored in the memory 104, which realizes the above method for acquiring identity authentication information. The memory 104 may include high-speed random access memories, and may also include non-volatile memories, such as one or more magnetic storage apparatuses, flash memories, or other non-volatile solid-state memories. In some examples, the memory 104 may further include memories remotely located with respect to the processors 102, and these remote memories may be connected to the computer terminal 10 through a network. Examples of the above network include, but are not limited to, the Internet, an intranet, a local area network, a mobile communication network, and combinations thereof.

The transmission apparatus 106 is used for receiving or sending data via a network. A specific example of the network mentioned above may include a wireless network provided by a communication provider of the computer terminal 10. In an example, the transmission apparatus 106 includes a network adapter (Network Interface Controller, NIC), which can be connected with other network devices through a base station so as to conduct communication with the Internet. In an example, the transmission apparatus 106 may be a radio frequency (RF) module, which is used for conducting communication with the Internet in a wireless manner.

The display may be, for example, a liquid crystal display (LCD) of a touch screen type, and the liquid crystal display can enable a user to interact with a user interface of the computer terminal 10 (or mobile device).

It should be noted here that in some embodiments, the computer device (or mobile device) shown in FIG. 1 above may include hardware elements (including circuits), software elements (including computer codes stored on computer-readable media), or a combination of both hardware elements and software elements. It should be noted that FIG. 1 is only one of specific examples, and is intended to show the types of components that may exist in the above-mentioned computer device (or mobile device).

In practical application scenarios of the Internet of Things, when using a Hardware as a service (HaaS) development board as an Internet of Things management platform for many devices, due to the high labor cost, complexity of applying for triples and complex development requirements, it is usually not to perform customized development for users in advance. In other words, a user needs to apply for device identity authentication information (triples) while using the HaaS development board to manage Internet of Things devices. This has led to the decrease of the efficiency of the Internet of Things management, the increase of cost and the deterioration of the sense of use of the HaaS development board.

Under the above operating environment, the present disclosure provides a method for acquiring identity authentication information as shown in FIG. 2. FIG. 2 is a schematic flowchart of a method for acquiring identity authentication information provided by an embodiment of the present disclosure. As shown in FIG. 2, the method for acquiring identity authentication information includes the following steps.

S202, receiving a request message from an Internet of Things device, where the request message is used for requesting to acquire identity authentication information, and the identity authentication information is applied for and obtained by a first server from a second server, where the first server is used for acquiring the identity authentication information from the second server in place of the Internet of Things device and managing the identity authentication information, and the second server is used for providing a target cloud service corresponding to the identity authentication information.

S204, returning the identity authentication information to the Internet of Things device in response to the request message, to enable the Internet of Things device to access the second server by using the identity authentication information.

In an implementation, the Internet of Things device may be a data transfer unit (DTU), and the Internet of Things device may send the request message for requesting to acquire its identity authentication information. The second server can be used for issuing the identity authentication information and providing the target cloud service, where the target cloud service corresponds to the identity authentication information. The first server can request, in place of the Internet of Things device, to the second server to acquire the identity authentication information, and manage the identity authentication information.

For example, the Internet of Things device may be a smart speaker, and identity authentication information of the smart speaker may be a corresponding device triple (including a product identifier, a device identifier and a device secret key). The first server may be a HaaS activation proxy service module, and the second server may be an LP (Link Platform) platform, which can provide a smart speaker voice cloud service. The HaaS activation proxy service module can request to the LP platform to acquire the device triple (including the product identifier, the device identifier and the device secret key) of the smart speaker in place of the smart speaker and manage the device triple.

In an implementation, the first server may respond to the request message sent by the Internet of Things device, and return the identity authentication information requested from the second server to the Internet of Things device. When the Internet of Things device needs to access the target cloud service which is provided by the second server and corresponds to the identity authentication information, the second server can perform access verification through the identity authentication information of the Internet of Things device, and have the Internet of Things device access if the verification is successful.

Still for example, the HaaS activation proxy service module can return the device triple requested from the LP platform to the smart speaker. When a smart speaker needs to be connected to the LP platform and access the smart speaker voice cloud service, the LP platform will judge whether to have the smart speaker access by verifying the device triple of the smart speaker. In the embodiment of the present disclosure, when the Internet of Things device needs to access the second server providing the target cloud service, the identity authentication information needs to be acquired. Firstly, the Internet of Things device sends the request message for acquiring the identity authentication information, and the request message can be received by the first server. Then, the first server acquires the identity authentication information of the Internet of Things device from the second server in place of the Internet of Things device, and the first server can manage the identity authentication information and return the identity authentication information to the corresponding Internet of Things device. At this time, the Internet of Things device can use the identity authentication information to access the second server. Therefore, the embodiment of the present disclosure achieves the purpose of enabling the Internet of Things device to acquire the identity authentication information dynamically so that the Internet of Things device can access the Internet of Things management platform, thereby achieving the technical effect of reducing the development and management costs of the identity authentication process of the Internet of Things device, and further solving the technical problem in the related art that the development and management costs of a processing method using pre-generated triples as the identity authentication information of the Internet of Things devices are high.

In an implementation, the above method for acquiring identity authentication information provided by the present disclosure can be applied to, but not limited to, the field of Internet of Things technology, and specifically, can be applied to, but not limited to, Internet of Things application scenarios such as intelligent transportation, smart home, public safety, natural environment intelligent perception, etc.

Figure 3:
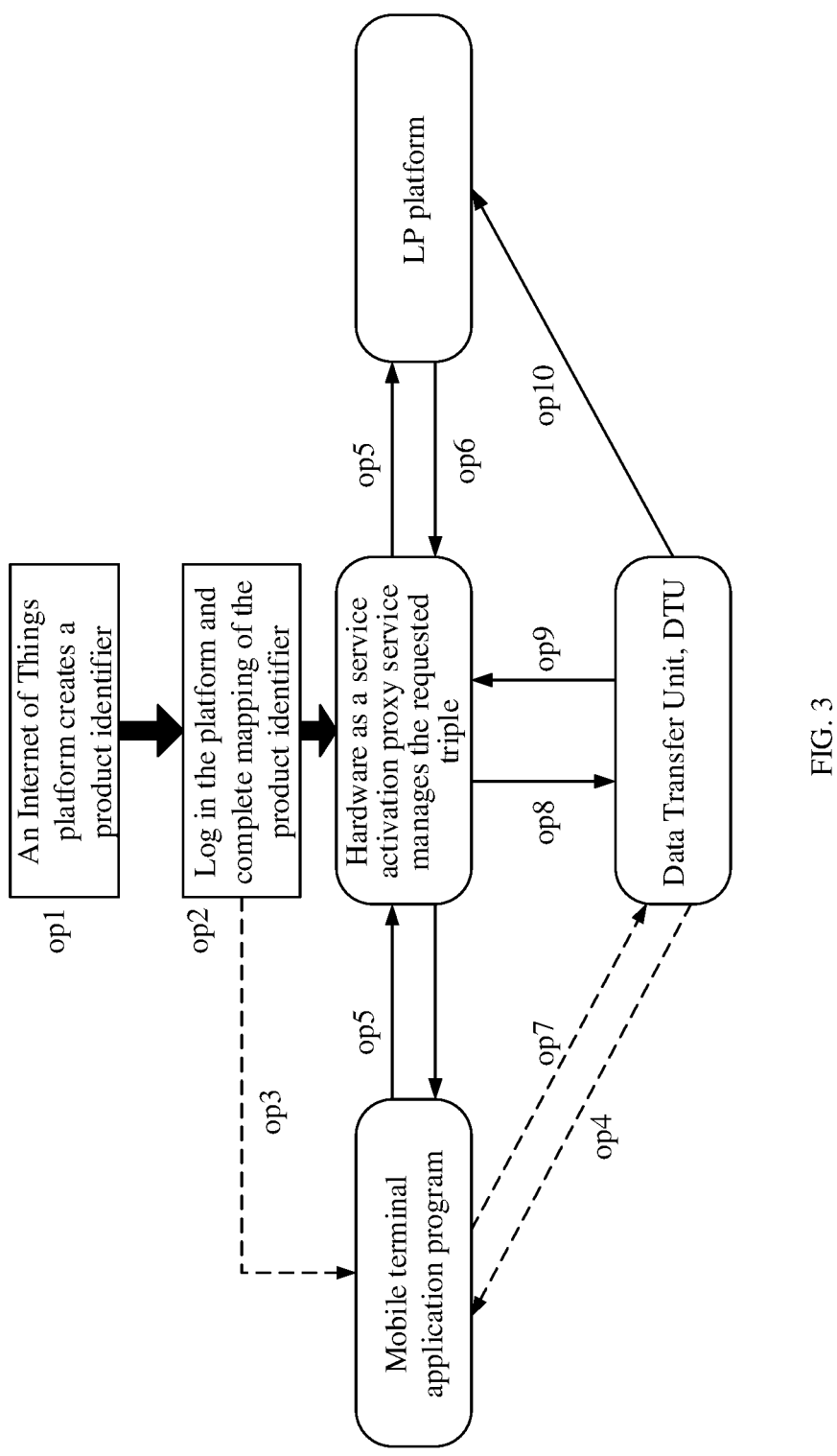
FIG. 3 is a schematic diagram of a process of acquiring an Internet of Things device triple provided by an embodiment of the present disclosure.

FIG. 3 is a schematic diagram of a process of acquiring an Internet of Things device triple provided by an embodiment of the present disclosure. As shown in FIG. 3, a data transfer unit (Data Transfer Unit, DTU, equivalent to the above Internet of Things device) can send a request message (equivalent to operation op9 in FIG. 3) which can be used for acquiring a triple (including a product identifier, a device identifier and a device secret key, equivalent to the above identity authentication information), and then a device is activated according to the triple. When receiving the request message, a HaaS activation proxy service module (equivalent to the above first server) can apply for (equivalent to operation op5 in FIG. 3) and obtain (equivalent to operation op6 in FIG. 3) the triple from the LP platform (equivalent to the above second server), where the LP platform can provide an Internet of Things management cloud service. After the HaaS activation proxy service module returns the triple (equivalent to operation op8 in FIG. 3) to the DTU device, the DTU device can use the triple to connect to the LP platform (equivalent to operation op10 in FIG. 3).

In the above embodiment, the triple can be dynamically applied for, managed and issued through the HaaS activation proxy service module (equivalent to the above first server), which can thus avoid the technical problem in the related art that the development and management costs caused by using the pre-generated triples as the identity authentication information of the Internet of Things devices are high.

In an embodiment, the method for acquiring identity authentication information further includes the following method steps.

S206, creating a first project on a first server, where the first project is used for managing a plurality of Internet of Things devices.

S208, adding a device identifier of the Internet of Things device in the first project, and generate connection information corresponding to the device identifier, where the connection information is used for establishing a connection between the Internet of Things device and the first server.

S210, writing the connection information into the Internet of Things device, to enable the Internet of Things device to establish a connection with the first server by using the connection information.

The above first server can be used for receiving the request message sent by the Internet of Things device, and applying for and obtaining the above identity authentication information from the above second server, and can also be used for managing a plurality of Internet of Things devices. Specifically, the above first project is created on the first server, and the first project can be used for managing a plurality of Internet of Things devices.

For example, the plurality of Internet of Things devices may be smart speakers, and the first server may be a HaaS activation proxy service module. A project (equivalent to the above first project) for managing the plurality of smart speakers is created in the HaaS activation proxy service module. The management of the plurality of smart speakers may include: sending a request message to the LP platform in place of each of the plurality of smart speakers, the request message being used for acquiring a device triple (including a product identifier, a device identifier and a device secret key, equivalent to identity authentication information); recording the device triple of each of the plurality of smart speakers: returning the device triple of each of the plurality of smart speakers to the corresponding smart speaker.

In the above first project, the device identifier of the above Internet of Things device can be added, and the connection information corresponding to the device identifier can also be generated. The connection information can be used for establishing a connection between the Internet of Things device and the first server, where the device identifier is a unique identifier corresponding to the device and is used for the management of the device. The connection information can be written into the Internet of Things device, so as to enable the Internet of Things device to establish a connection with the first server. The first server can request, in place of the Internet of Things device, to the second server to acquire the identity authentication information, and manage the identity authentication information.

For example, the plurality of Internet of Things devices may be smart speakers, and the first server may be a HaaS activation proxy service module. A project (equivalent to the above first project) for managing the plurality of smart speakers is created in the HaaS activation proxy service module. In this project, device IDs (equivalent to the above device identifier) can be added for the smart speakers, and connection information corresponding to the device IDs can also be generated. Using the connection information, the smart speakers can establish connections with the above HaaS activation proxy service module.

In an embodiment, in the method for acquiring identity authentication information, the connection information includes identifier information, private key information and public key information, where the identifier information is an identifier applied for by the Internet of Things device, and a combination of the private key information and the public key information is used for encrypting data transmitted between the Internet of Things device and the first server.

The connection information generated based on the first project on the first server may include the above identifier information, private key information and public key information. The connection information corresponds to the Internet of Things device that sends the request message. For example, the identifier information generated by the project for managing the plurality of smart speakers in the HaaS activation proxy service module may be application identifiers of the smart speakers for applying for identity authentication information, and the combination of the private key information and the public key information generated by this project can be used for encrypting the data transmitted between the smart speakers and the HaaS activation proxy service module (such as the device triples returned to the smart speakers, the request messages sent by the smart speakers, etc.).

In an embodiment, the method for acquiring identity authentication information further includes the following method steps.

S212, creating a second project on the first server, where the second project is used for managing a plurality of pre-developed products, and each product of the plurality of pre-developed products provides a different type of service functions separately.

The above first server can be used for receiving the request message sent by the Internet of Things device, and applying for and obtaining the identity authentication information from the above second server, and can also be used for managing a plurality of products. Specifically, the above second project is created on the first server, and the second project can be used for managing a plurality of products.

In an implementation, the above products may be pre-developed products, and the plurality of pre-developed products may be multiple categories of products, where each product of the plurality of products may provide a different type of service functions. For example, for products such as smart speakers and smart bulbs developed by a brand provider in advance, the smart speakers can provide services such as playing audio and voice intelligent assistants, and the smart bulbs can realize functions such as brightness adjustment and color temperature adjustment. A project (equivalent to the above second project) for managing the plurality of pre-developed products can be created in the corresponding HaaS activation proxy service module (equivalent to the above first server).

In an embodiment, the method for acquiring identity authentication information further includes the following method steps.

S214, associating a target product with the second project and creating a binding batch on the first server, to enable the first server to apply for the identity authentication information for the Internet of Things device, where the target product is applied to the Internet of Things device, and the binding batch is used for association with the device identifier.

The above target product may be a product applied on the Internet of Things device, and the binding batch can be used for association with the device identifier corresponding to the Internet of Things device that sends the request message. On the above first server, the target product is associated with the second project, and the binding batch is created, so that the first server can apply for the identity authentication information from the second server for the Internet of Things device.

For example, in a practical application scenario of the Internet of Things, a solution provider provides an Internet of Things management platform and management solutions, and brand providers use the management platform and management solutions to manage Internet of Things devices and further complete the product development. Specifically, a cloud management platform of an enterprise can provide a management platform and management solutions for smart speakers and smart bulbs as a solution provider. Smart speakers and smart bulbs of brand A, smart speakers of brand B and smart bulbs of brand C can all access the cloud management platform of the enterprise with identity authentication information, and then required functions (such as voice control, Internet remote startup, family group sharing, etc.) of the smart speakers and smart bulbs continue to be configured on the cloud management platform of the enterprise.

Figure 4:
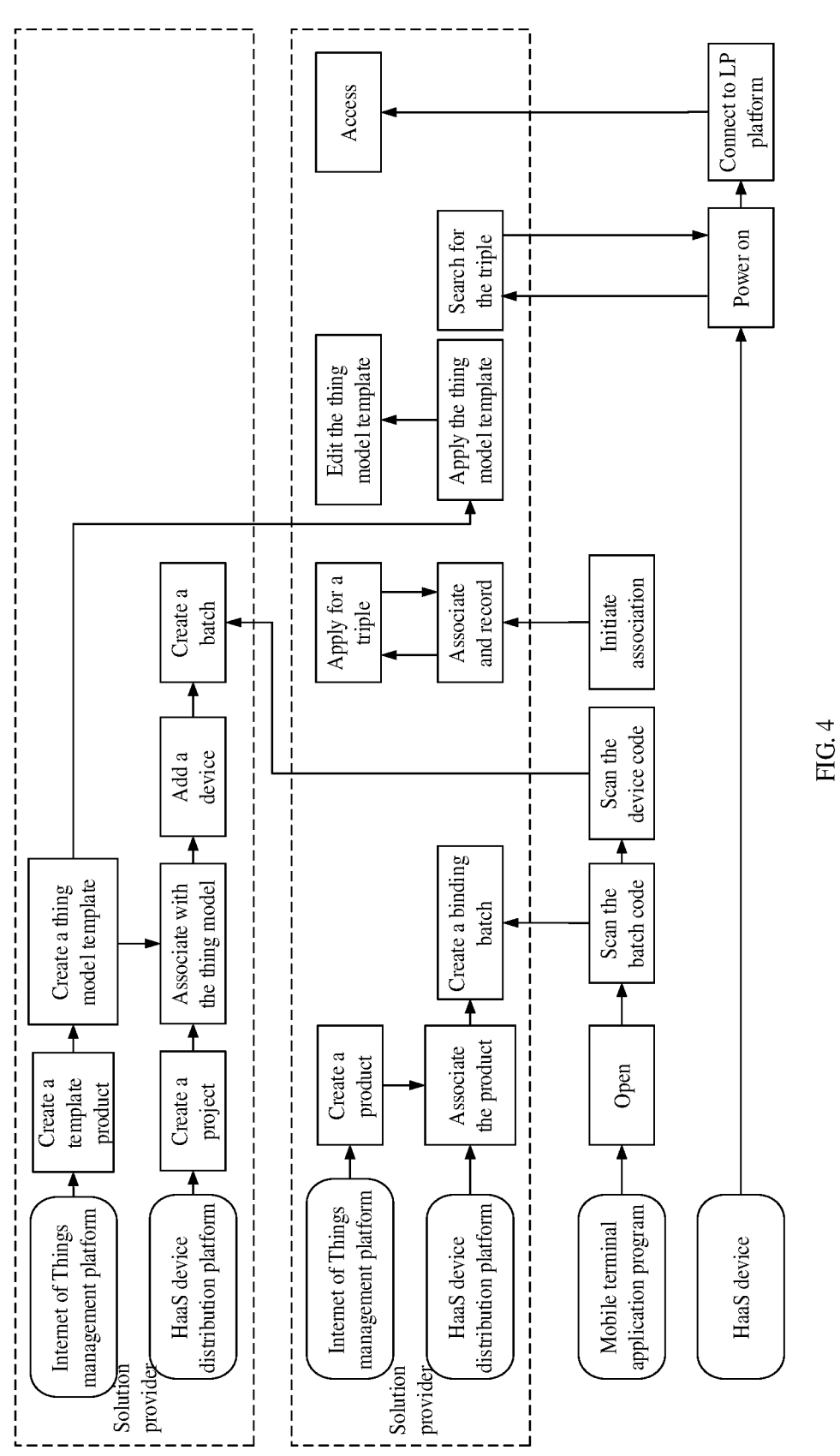
FIG. 4 is a schematic diagram of a specific process of acquiring an Internet of Things device triple provided by an embodiment of the present disclosure.

FIG. 4 is a schematic diagram of a specific process of acquiring an Internet of Things device triple provided by an embodiment of the present disclosure. As shown in FIG. 4, a HaaS activation proxy service module (equivalent to the above first server) may include a solution provider project module (equivalent to the above first project), a brand provider project module (equivalent to the above second project) and a mobile terminal application program.

The above solution provider project module can be used by a solution provider for managing Internet of Things devices. In the solution provider project module, a HaaS device distribution platform can create a project, and then add devices and create a batch. In an implementation, a template product can be created and a thing model template can be further created through an Internet of Things management platform. After creating the project, the HaaS device distribution platform associates the created project with the thing model template.

Adding a device by the HaaS device distribution platform can include the following two method steps: step one, adding a device identifier (such as a physical address, an international mobile equipment identity, etc.) of an Internet of Things device; step two, generating a triple (equivalent to the above identity authentication information) corresponding to the created project, where the triple may include a product identifier, a device identifier and a device secret key (which may include the above private key information and the above public key information).

It should be noted that the triple correspond to the Internet of Things device as a fixed parameter and is used for the Internet of Things device to access the HaaS device distribution platform. In addition, in the solution provider project module, for the same one project, all the added Internet of Things devices use the same triples. This method has practical significance for application scenarios with many Internet of Things devices to be managed.

The above brand provider project module can be used by a brand provider for managing Internet of Things devices and developing products. In the brand provider project module, firstly, a product is created through the Internet of Things management platform: then, the created product is associated with the project pre-created by the solution provider through the HaaS device distribution platform: further, a binding batch is created, and the binding batch is used for representing the corresponding relationship between a batch and Internet of Things devices.

It should be noted that, according to the above corresponding relationship between the batch and the Internet of Things devices, triple proxy application can be made for the Internet of Things devices in the binding batch on the HaaS device distribution platform.

In the mobile terminal application program, users can scan a binding batch code created in the above brand provider project module. Users can also scan a device code of a HaaS device added in the above solution provider project module to obtain a device identifier (such as a physical address, an international mobile equipment identity, etc.) corresponding to the HaaS device. The application program associates the HaaS device with the binding batch, so that the HaaS device is automatically connected to the triple corresponding to the HaaS device distribution platform when being turned on.

In an embodiment, in the method for acquiring identity authentication information, encryption processing is performed on the request message in a preset encryption manner.

The above request message is a message sent by the Internet of Things device to the first server to request to acquire the identity authentication information. In order to ensure the security of the application, management and issuing of the identity authentication information, the request message is processed by encryption in the above preset encryption manner.

In an implementation, the preset encryption manner may be RSA encryption, advanced encryption standard (AES) encryption, etc. Among them, the RSA encryption is a public key password system proposed by Ron Rivest, Adi Shamir and Leonard Adleman, i.e., a system in which an encryption secret key is public and a decryption secret key is confidential. The AES encryption is a manner of encryption using a symmetric secret key.

One of the embodiments of the present disclosure also provides a method for acquiring identity authentication information, which runs on an Internet of Things device. FIG. 5 is a schematic flowchart of another method for acquiring identity authentication information provided by an embodiment of the present disclosure. As shown in FIG. 5, the method for acquiring identity authentication information includes the following steps.

S502, sending a request message to a first server, where the request message is used for requesting to acquire identity authentication information, and the identity authentication information is applied for and obtained by the first server from a second server, where the first server is used for acquiring the identity authentication information from the second server in place of the Internet of Things device and managing the identity authentication information, and the second server is used for providing a target cloud service corresponding to the identity authentication information.

S504, receiving the identity authentication information returned by the first server.

S506, accessing the second server by using the identity authentication information.

The above target cloud service may be an Internet of Things device management cloud service, and the above second server may be used for providing the target cloud service corresponding to the identity authentication information. The above first server can be used for acquiring the identity authentication information from the second server in place of the Internet of Things device and managing the identity authentication information. The Internet of Things device can send the request message to the above first server. The request message can be used for requesting to acquire the identity authentication information of the Internet of Things device, and the identity authentication information can be applied for and obtained by the first server from the second server.

In an implementation, the identity authentication information may be a triple corresponding to the Internet of Things device, and the triple may include a product identifier, a device identifier and a device secret key. After obtaining the identity authentication information issued by the second server, the first server can return the identity authentication information to the Internet of Things device.

After receiving the identity authentication information returned by the first server, the Internet of Things device can access the second server by using the identity authentication information, so as to acquire the target cloud service provided by the second server.

In the embodiment of the present disclosure, when the Internet of Things device needs to access the second server providing the target cloud service, the identity authentication information needs to be acquired. Firstly, the Internet of Things device sends the request message for acquiring the identity authentication information, and the request message can be received by the first server. Then, the first server acquires the identity authentication information of the Internet of Things device from the second server in place of the Internet of Things device, and the first server can manage the identity authentication information and return the identity authentication information to the corresponding Internet of Things device. At this time, the Internet of Things device can use the identity authentication information to access the second server. Therefore, the embodiment of the present disclosure achieves the purpose of enabling the Internet of Things device to acquire the identity authentication information dynamically so that the Internet of Things device can access the Internet of Things management platform, thereby achieving the technical effect of reducing the development and management costs of the identity authentication process of the Internet of Things device, and further solving the technical problem in the related art that the development and management costs of a processing method using pre-generated triples as identity authentication information of Internet of Things devices are high.

It should be noted that for simple description, all the aforementioned method embodiments are expressed as a combination of a series of actions, but a person skilled in the art should know that the present disclosure is not limited by the described action order, because some steps can be performed in other orders or performed at the same time according to the present disclosure. Secondly, a person skilled in the art should also know that the embodiments described in the specification belong to preferred embodiments, and the actions and modules involved are not necessarily necessary for the present disclosure.

Through the description of the above embodiments, a person skilled in the art can clearly understand that the methods according to the above embodiments can be implemented by means of software and necessary general hardware platform, and of course can also be implemented by hardware, but in many cases the former is a better implementation. Based on this understanding, the technical solution of the present disclosure in essence or the part that contributes to the prior art can be embodied in the form of a software product, and the computer software product is stored in a storage medium (such as a ROM/RAM, a magnetic disk, an optical disk) and includes several instructions to cause a terminal device (which may be a mobile phone, a computer, a server or a network device, etc.) to execute the methods described in various embodiments of the present disclosure.

Embodiment 2

According to an embodiment of the present disclosure, an apparatus embodiment for implementing the above method for acquiring identity authentication information is also provided. FIG. 6 is a schematic structural diagram of an apparatus for acquiring identity authentication information provided by an embodiment of the present disclosure. As shown in FIG. 6, the apparatus includes a receiving module 601 and a feedback module 602.

The receiving module 601 is configured to receive a request message from an Internet of Things device, where the request message is used for requesting to acquire identity authentication information, and the identity authentication information is applied for and obtained by a first server from a second server, where the first server is used for acquiring the identity authentication information from the second server in place of the Internet of Things device and managing the identity authentication information, and the second server is used for providing a target cloud service corresponding to the identity authentication information. The feedback module 602 is configured to return the identity authentication information to the Internet of Things device in response to the request message, to enable the Internet of Things device to access the second server by using the identity authentication information.

Figure 7:
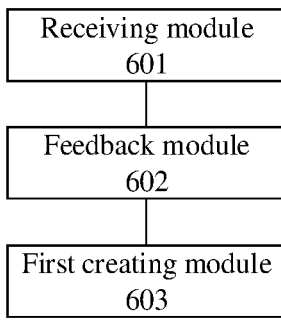
FIG. 7 is a schematic structural diagram of an apparatus for acquiring identity authentication information provided by an embodiment of the present disclosure.

In an implementation, FIG. 7 is a schematic structural diagram of an apparatus for acquiring identity authentication information according to an embodiment of the present disclosure. As shown in FIG. 7, in addition to all the modules shown in FIG. 6, the apparatus further includes: a first creating module 603, configured to create a first project on the first server, where the first project is used for managing a plurality of Internet of Things devices; add a device identifier of the Internet of Things device in the first project, and generate connection information corresponding to the device identifier, where the connection information is used for establishing a connection between the Internet of Things device and the first server; writing the connection information into the Internet of Things device, to enable the Internet of Things device to establish a connection with the first server by using the connection information.

Figure 8:
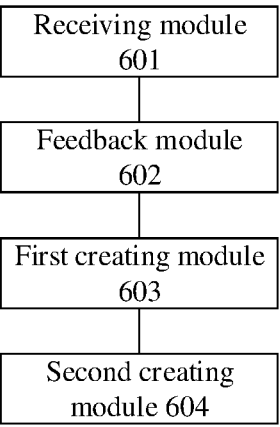
FIG. 8 is a schematic structural diagram of an apparatus for acquiring identity authentication information provided by an embodiment of the present disclosure.

In an implementation, FIG. 8 is a schematic structural diagram of an apparatus for acquiring identity authentication information provided by an embodiment of the present disclosure. As shown in FIG. 8, in addition to all the modules shown in FIG. 7, the apparatus further includes: a second creating module 604, configured to create a second project on the first server, where the second project is used for managing a plurality of pre-developed products, and each product of the plurality of pre-developed products provides a different type of service functions separately.

Figure 9:
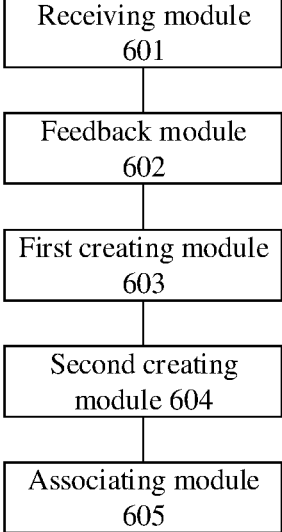
FIG. 9 is a schematic structural diagram of an apparatus for acquiring identity authentication information provided by an embodiment of the present disclosure.

In an implementation, FIG. 9 is a schematic structural diagram of an apparatus for acquiring identity authentication information provided by an embodiment of the present disclosure. As shown in FIG. 9, in addition to all the modules shown in FIG. 8, the apparatus further includes: an associating module 605, configured to associate a target product with the second project and create a binding batch on the first server, to enable the first server to apply for the identity authentication information for the Internet of Things device, where the target product is applied to the Internet of Things device, and the binding batch is used for association with the device identifier.

Figure 10:
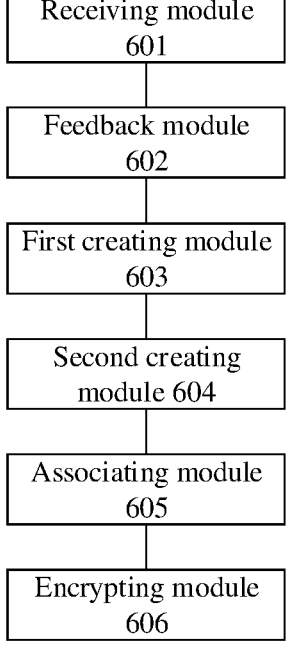
FIG. 10 is a schematic structural diagram of an apparatus for acquiring identity authentication information provided by an embodiment of the present disclosure.

In an implementation, FIG. 10 is a schematic structural diagram of an apparatus for acquiring identity authentication information provided by an embodiment of the present disclosure. As shown in FIG. 10, in addition to all the modules shown in FIG. 9, the apparatus further includes: an encrypting module 606, configured to perform encryption processing on the request message in a preset encryption manner.

It should be noted here that the above receiving module 601 and feedback module 602 correspond to steps S202 and S204 in Embodiment 1, and the examples and application scenarios realized by the two modules are the same as those of the corresponding steps, but are not limited to the contents disclosed in Embodiment 1. It should be noted that, as a part of the apparatus, the above modules can be run in the computer terminal 10 provided by Embodiment 1.

In the embodiment of the present disclosure, when the Internet of Things device needs to access the second server providing the target cloud service, the identity authentication information needs to be acquired. Firstly, the Internet of Things device sends the request message for acquiring the identity authentication information, and the request message can be received by the first server. Then, the first server acquires the identity authentication information of the Internet of Things device from the second server in place of the Internet of Things device, and the first server can manage the identity authentication information and return the identity authentication information to the corresponding Internet of Things device. At this time, the Internet of Things device can use the identity authentication information to access the second server. Therefore, the embodiment of the present disclosure achieves the purpose of enabling the Internet of Things device to acquire the identity authentication information dynamically so that the Internet of Things device can access the Internet of Things management platform, thereby achieving the technical effect of reducing the development and management costs of the identity authentication process of the Internet of Things device, and further solving the technical problem in the related art that the development and management costs of a processing method using pre-generated triples as identity authentication information of Internet of Things devices are high.

Figure 11:
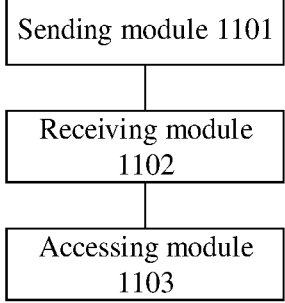
FIG. 11 is a schematic structural diagram of another apparatus for acquiring identity authentication information provided by an embodiment of the present disclosure.

According to an embodiment of the present disclosure, an apparatus embodiment for implementing the above method for acquiring identity authentication information is also provided. FIG. 11 is a schematic structural diagram of another apparatus for acquiring identity authentication information provided by an embodiment of the present disclosure. As shown in FIG. 11, the apparatus includes a sending module 1101, a receiving module 1102 and an accessing module 1103.

The sending module 1101 is configured to send a request message to a first server, where the request message is used for requesting to acquire identity authentication information, and the identity authentication information is applied for and obtained by the first server from a second server, where the first server is used for acquiring the identity authentication information from the second server in place of an Internet of Things device and managing the identity authentication information, and the second server is used for providing a target cloud service corresponding to the identity authentication information; the receiving module 1102 is configured to receive the identity authentication information returned by the first server; the accessing module 1103 is configured to access the second server by using the identity authentication information.

It should be noted here that the above sending module 1101, receiving module 1102 and accessing module 1103 correspond to steps S502 to S506 in Embodiment 1, and the examples and application scenarios realized by the three modules are the same as those of the corresponding steps, but are not limited to the contents disclosed in Embodiment 1. It should be noted that, as a part of the apparatus, the above modules can be run in the computer terminal 10 provided by Embodiment 1.

In the embodiment of the present disclosure, when the Internet of Things device needs to access the second server providing the target cloud service, the identity authentication information needs to be acquired. Firstly, the Internet of Things device sends the request message to the first server, where the request message is used for acquiring the identity authentication information. Then, the first server acquires the identity authentication information of the Internet of Things device from the second server in place of the Internet of Things device, and the first server can manage the identity authentication information and return the identity authentication information to the corresponding Internet of Things device. At this time, the Internet of Things device can use the identity authentication information to access the second server. Therefore, the embodiment of the present disclosure achieves the purpose of enabling the Internet of Things device to acquire the identity authentication information dynamically so that the Internet of Things device can access the Internet of Things management platform, thereby achieving the technical effect of reducing the development and management costs of the identity authentication process of the Internet of Things device, and further solving the technical problem in the related art that the development and management costs of a processing method using pre-generated triples as identity authentication information of Internet of Things devices are high.

It should be noted that preferred implementations of this embodiment can be found in the relevant description in Embodiment 1, which will not be repeated here.

Embodiment 3

According to an embodiment of the present disclosure, an embodiment of an electronic apparatus is also provided. The electronic apparatus may be any computing apparatus in a computing apparatus group. The electronic apparatus includes a processor and a memory.

The memory is connected with the processor and used for providing the processor with instructions for processing the following processing steps: receiving a request message from an Internet of Things device, where the request message is used for requesting to acquire identity authentication information, and the identity authentication information is applied for and obtained by a first server from a second server, where the first server is used for acquiring the identity authentication information from the second server in place of the Internet of Things device and managing the identity authentication information, and the second server is used for providing a target cloud service corresponding to the identity authentication information: returning the identity authentication information to the Internet of Things device in response to the request message, to enable the Internet of Things device to access the second server by using the identity authentication information.

In the embodiment of the present disclosure, when the Internet of Things device needs to access the second server providing the target cloud service, the identity authentication information needs to be acquired. Firstly, the Internet of Things device sends the request message for acquiring the identity authentication information, and the request message can be received by the first server. Then, the first server acquires the identity authentication information of the Internet of Things device from the second server in place of the Internet of Things device, and the first server can manage the identity authentication information and return the identity authentication information to the corresponding Internet of Things device. At this time, the Internet of Things device can use the identity authentication information to access the second server. Therefore, the embodiment of the present disclosure achieves the purpose of enabling the Internet of Things device to acquire the identity authentication information dynamically so that the Internet of Things device can access the Internet of Things management platform, thereby achieving the technical effect of reducing the development and management costs of the identity authentication process of the Internet of Things device, and further solving the technical problem in the related art that the development and management costs of a processing method using pre-generated triples as identity authentication information of Internet of Things devices are high.

It should be noted that preferred implementations of this embodiment can be found in the relevant description in Embodiment 1, which will not be repeated here.

Embodiment 4

An embodiment of the present disclosure can provide a computer terminal, which may be any computer terminal device in a computer terminal group. In an implementation, in this embodiment, the computer terminal may also be replaced by a terminal device such as a mobile terminal.

In an implementation, in this embodiment, the computer terminal may be located in at least one network device among a plurality of network devices of a computer network.

In this embodiment, the computer terminal can execute program codes of the following steps in a method for acquiring identity authentication information: receiving a request message from an Internet of Things device, where the request message is used for requesting to acquire identity authentication information, and the identity authentication information is applied for and obtained by a first server from a second server, where the first server is used for acquiring the identity authentication information from the second server in place of the Internet of Things device and managing the identity authentication information, and the second server is used for providing a target cloud service corresponding to the identity authentication information; returning the identity authentication information to the Internet of Things device in response to the request message, to enable the Internet of Things device to access the second server by using the identity authentication information.

Figure 12:
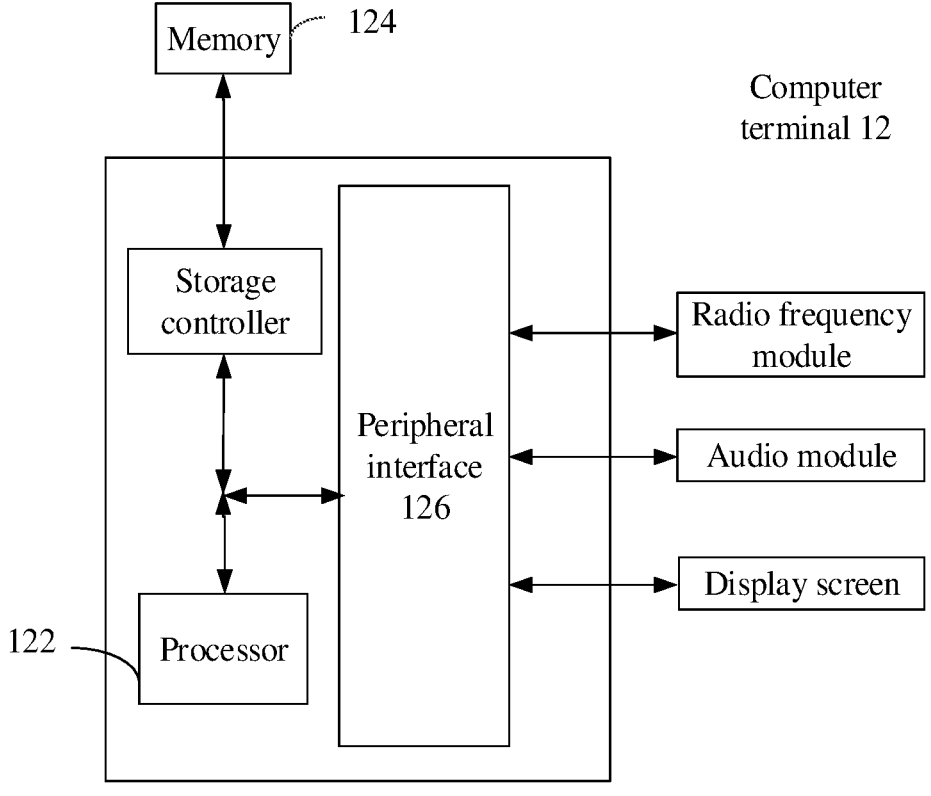
FIG. 12 is a structural block diagram of another computer terminal provided by an embodiment of the present disclosure.

In an implementation, FIG. 12 is a schematic structural diagram of another computer terminal provided by an embodiment of the present disclosure. As shown in FIG. 12, the computer terminal may include one or more (only one is shown in FIG. 12) processors 122, a memory 124 and a peripheral interface 126.

Among them, the memory can be used for storing software programs and modules, such as program instructions/modules corresponding to the method and apparatus for acquiring identity authentication information in the embodiments of the present disclosure, and the processors execute various functional applications and data processing by running the software programs and modules stored in the memory, that is, realizing the above method for acquiring identity authentication information. The memory may include high-speed random access memories, and may also include non-volatile memories, such as one or more magnetic storage apparatuses, flash memories, or other non-volatile solid-state memories. In some examples, the memory may further include memories remotely located with respect to the processors, and these remote memories may be connected to the computer terminal through a network. Examples of the above networks include, but are not limited to, the Internet, an intranet, a local area network, a mobile communication network, and combinations thereof.

The processors can call the information and application programs stored in the memory through the transmission apparatus to perform the following steps: receiving a request message from an Internet of Things device, where the request message is used for requesting to acquire identity authentication information, and the identity authentication information is applied for and obtained by a first server from a second server, where the first server is used for acquiring the identity authentication information from the second server in place of the Internet of Things device and managing the identity authentication information, and the second server is used for providing a target cloud service corresponding to the identity authentication information: returning the identity authentication information to the Internet of Things device in response to the request message, to enable the Internet of Things device to access the second server by using the identity authentication information.

In an implementation, the processors can also execute program codes of the following steps: creating a first project on a first server, where the first project is used for managing a plurality of Internet of Things devices; adding a device identifier of the Internet of Things device in the first project, and generating connection information corresponding to the device identifier, where the connection information is used for establishing a connection between the Internet of Things device and the first server: writing the connection information into the Internet of Things device, to enable the Internet of Things device to establish a connection with the first server by using the connection information.

In an implementation, the processors can also execute program codes of the following steps: creating a second project on the first server, where the second project is used for managing a plurality of pre-developed products, and each product of the plurality of the pre-developed products provides a different type of service functions separately.

In an implementation, the processors can also execute program codes of the following steps: associating a target product with the second project and create a binding batch on the first server, to enable the first server to apply for the identity authentication information for the Internet of Things device, where the target product is applied to the Internet of Things device, and the binding batch is used for association with the device identifier.

The processors can call the information and application programs stored in the memory through the transmission apparatus to perform the following steps: sending a request message to a first server, where the request message is used for requesting to acquire identity authentication information, and the identity authentication information is applied for and obtained by the first server from a second server, where the first server is used for acquiring the identity authentication information from the second server in place of an Internet of Things device and managing the identity authentication information, and the second server is used for providing a target cloud service corresponding to the identity authentication information; receiving the identity authentication information returned by the first server; accessing the second server by using the identity authentication information.

In the embodiments of the present disclosure, when the Internet of Things device needs to access the second server providing the target cloud service, the identity authentication information needs to be acquired. Firstly, the Internet of Things device sends the request message for acquiring the identity authentication information, and the request message can be received by the first server. Then, the first server acquires the identity authentication information of the Internet of Things device from the second server in place of the Internet of Things device, and the first server can manage the identity authentication information and return the identity authentication information to the corresponding Internet of Things device. At this time, the Internet of Things device can use the identity authentication information to access the second server. Therefore, the embodiments of the present disclosure achieve the purpose of enabling the Internet of Things device to acquire the identity authentication information dynamically so that the Internet of Things device can access the Internet of Things management platform, thereby achieving the technical effect of reducing the development and management costs of the identity authentication process of the Internet of Things device, and further solving the technical problem in the related art that the development and management costs of a processing method using pre-generated triples as identity authentication information of Internet of Things devices are high.

A person skilled in the art can understand that the structure shown in FIG. 12 is only schematic, and the computer terminal may also be terminal devices such as smart phones (such as Android phones, iOS phones, etc.), tablet computers, palmtop computers, mobile Internet devices (MIDs) and PADs. FIG. 12 does not limit the structure of the above electronic apparatus. For example, the computer terminal may also include more or fewer components (such as network interfaces, display apparatuses, etc.) than those shown in FIG. 12, or have a different configuration from that shown in FIG. 12.

A person skilled in the art can understand that all or part of the steps in the various methods of the above embodiments can be completed by a program instructing hardware related to the terminal device, and the program can be stored in a computer-readable storage medium, which may include a flash disk, a read-only memory (ROM), a random access memory (RAM), a magnetic disk, or an optical disk, etc.

According to an embodiment of the present disclosure, an embodiment of a storage medium is also provided. In an implementation, in this embodiment, the storage medium can be used for storing the program codes executed by the method for acquiring identity authentication information provided in Embodiment 1.

In an implementation, in this embodiment, the storage medium can be located in any computer terminal in a computer terminal group in a computer network or in any mobile terminal in a mobile terminal group.

In an implementation, in this embodiment, the storage medium is provided to store program codes for executing the following steps: receiving a request message from an Internet of Things device, where the request message is used for requesting to acquire identity authentication information, and the identity authentication information is applied for and obtained by a first server from a second server, where the first server is used for acquiring the identity authentication information from the second server in place of the Internet of Things device and managing the identity authentication information, and the second server is used for providing a target cloud service corresponding to the identity authentication information; returning the identity authentication information to the Internet of Things device in response to the request message, to enable the Internet of Things device to access the second server by using the identity authentication information.

In an implementation, in this embodiment, the storage medium is provided to store program codes for executing the following steps: creating a first project on a first server, where the first project is used for managing a plurality of Internet of Things devices: adding a device identifier of the Internet of Things device in the first project, and generating connection information corresponding to the device identifier, where the connection information is used for establishing a connection between the Internet of Things device and the first server: writing the connection information into the Internet of Things device, to enable the Internet of Things device to establish a connection with the first server by using the connection information.

In an implementation, in this embodiment, the storage medium is provided to store program codes for executing the following steps: creating a second project on the first server, where the second project is used for managing a plurality of pre-developed products, and each product of the plurality of pre-developed products provides a different type of service functions separately.

In an implementation, in this embodiment, the storage medium is provided to store the program codes for executing the following steps: associating a target product with the second project and creating a binding batch on the first server, to enable the first server to apply for the identity authentication information for the Internet of Things device, where the target product is applied to the Internet of Things device, and the binding batch is used for association with the device identifier.

In an implementation, in this embodiment, the storage medium is provided to store program codes for executing the following steps: sending a request message to a first server, where the request message is used for requesting to acquire identity authentication information, and the identity authentication information is applied for and obtained by the first server from a second server, where the first server is used for acquiring the identity authentication information from the second server in place of an Internet of Things device and managing the identity authentication information, and the second server is used for providing a target cloud service corresponding to the identity authentication information: receiving the identity authentication information returned by the first server: accessing the second server by using the identity authentication information.

The serial numbers of the above embodiments of the present disclosure are only for description and do not represent the advantages and disadvantages of the embodiments.

In the above embodiments of the present disclosure, the description of each embodiment has its own emphasis. For the parts not detailed in one embodiment, please refer to the related descriptions of other embodiments.

In several embodiments provided by the present disclosure, it should be understood that the disclosed technical contents can be realized in other ways. Among them, the apparatus embodiments described above are only schematic. For example, the division of the units is merely logical function division and there may be other division manners in actual implementations. For example, multiple units or components can be combined or integrated into another system, or some features can be ignored or not executed. On the other hand, the mutual coupling or direct coupling or communication connection shown or discussed can be indirect coupling or communication connection through some interfaces, units or modules, which can be electrical or other forms.

The units described as separate components may or may not be physically separated, and the components displayed as units may or may not be physical units, that is, they may be located in one place or distributed to multiple network units. Some or all of the units can be selected according to actual needs to achieve the purpose of the solution of the embodiment.

In addition, functional units in the embodiments of the present disclosure may be integrated into one processing unit, or each unit may exist physically alone, or two or more units may be integrated into one unit. The above integrated unit can be realized in the form of hardware or a software functional unit.

The integrated unit can be stored in a computer-readable storage medium if it is implemented in the form of a software functional unit and sold or used as an independent product. Based on this understanding, the technical solution of the present disclosure in essence or the part that contributes to the prior art or all or part of the technical solution can be embodied in the form of a software product, and the computer software product is stored in a storage medium and includes several instructions to cause a computer device (which may be a personal computer, a server or a network device, etc.) to execute all or part of the steps of the methods according to various embodiments of the present disclosure. The aforementioned storage medium includes any medium that can store program codes, such as a USB flash disk, a read-only memory (ROM), a random access memory (RAM), a mobile hard disk, a magnetic disk, or an optical disk, etc.

The above are only preferred embodiments of the present disclosure. It should be noted that a person skilled in the art can make several improvements and embellishments without departing from the principle of the present disclosure, and these improvements and embellishments should also be regarded as falling within the protection scope of the present disclosure.

The invention claimed is:

1. A method for acquiring identity authentication information, comprising:
creating a second project on a first server, wherein the second project is used for managing a plurality of pre-developed products, and each product of the plurality of pre-developed products provides a different type of service function separately;
associating a target product with the second project and creating a binding batch on the first server, to enable the first server to apply for identity authentication information for an Internet of Things device, wherein the target product is applied to the Internet of Things device, and the binding batch is used for association with a device identifier of the Internet of Things device;
receiving a request message from the Internet of Things device, wherein the request message is used for requesting to acquire the identity authentication information, and the identity authentication information is applied for and obtained by the first server from a second server, wherein the first server is used for acquiring the identity authentication information from the second server in place of the Internet of Things device and managing the identity authentication information, and the second server is used for providing a target cloud service corresponding to the identity authentication information; and
returning the identity authentication information to the Internet of Things device in response to the request message, to enable the Internet of Things device to access the second server by using the identity authentication information.

2. The method according to claim 1, wherein the method further comprises:
creating a first project on the first server, wherein the first project is used for managing a plurality of Internet of Things devices;
adding the device identifier of the Internet of Things device in the first project, and generating connection information corresponding to the device identifier, wherein the connection information is used for establishing a connection between the Internet of Things device and the first server; and
writing the connection information into the Internet of Things device, to enable the Internet of Things device to establish a connection with the first server by using the connection information.

3. The method according to claim 2, wherein the connection information comprises identifier information, private key information and public key information, wherein the identifier information is an identifier applied for by the Internet of Things device, and a combination of the private key information and the public key information is used for encrypting data transmitted between the Internet of Things device and the first server.

4. The method according to claim 1, wherein encryption processing is performed on the request message in a preset encryption manner.

5. A non-transitory storage medium comprising a stored program, wherein when the program is run, a device where the non-transitory storage medium is located is controlled to execute the method for acquiring identity authentication information according to claim 1.

6. An apparatus for acquiring identity authentication information, comprising:
at least one processor; and
a memory connected with the at least one processor;
wherein the memory stores instructions executable by the at least one processor, and the instructions are executed by the at least one processor to cause a device to perform the method for acquiring identity authentication information according to claim 1.

7. The apparatus according to claim 6, wherein the at least one processor is further caused to:
create a first project on the first server, wherein the first project is used for managing a plurality of Internet of Things devices;
add the device identifier of the Internet of Things device in the first project, and generate connection information corresponding to the device identifier, wherein the connection information is used for establishing a connection between the Internet of Things device and the first server; and
write the connection information into the Internet of Things device, to enable the Internet of Things device to establish a connection with the first server by using the connection information.

8. The apparatus according to claim 7, wherein the connection information comprises identifier information, private key information and public key information, wherein the identifier information is an identifier applied for by the Internet of Things device, and a combination of the private key information and the public key information is used for encrypting data transmitted between the Internet of Things device and the first server.

9. The apparatus according to claim 6, wherein encryption processing is performed on the request message in a preset encryption manner.

10. A method for acquiring identity authentication information, comprising:

sending a request message to a first server, wherein the request message is used for requesting to acquire identity authentication information, and the identity authentication information is applied for and obtained by the first server from a second server, wherein the first server is used for acquiring the identity authentication information from the second server in place of an Internet of Things device and managing the identity authentication information, and the second server is used for providing a target cloud service corresponding to the identity authentication information;

receiving the identity authentication information returned by the first server; and accessing the second server by using the identity authentication information wherein a second project is created on the first server, the second project is used for managing a plurality of pre-developed products, and each product of the plurality of pre-developed products provides a different type of service function separately; a target product is associated with the second project and a binding batch is created on the first server, to enable the first server to apply for the identity authentication information for the Internet of Things device, and the target product is applied to the Internet of Things device, and the binding batch is used for association with a device identifier of the Internet of Things device.

11. An apparatus for acquiring identity authentication information, comprising:

at least one processor; and a memory connected with the at least one processor;

wherein the memory stores instructions executable by the at least one processor, and the instructions are executed by the at least one processor to cause a device to perform the method for acquiring identity authentication information according to claim 10.

12. A non-transitory storage medium comprising a stored program, wherein when the program is run, a device where the non-transitory storage medium is located is controlled to execute the method for acquiring identity authentication information according to claim 10.

13. A system for acquiring identity authentication information, the system comprising:

an Internet of Things device; a first server; and a second server, wherein the Internet of Things device is configured to:

send a request message to the first server, wherein the request message is used for requesting to acquire identity authentication information, and the identity authentication information is applied for and obtained by the first server from the second server;

receive the identity authentication information returned by the first server; and access the second server by using the identity authentication information;

the first server is configured to:

create a second project on the first server, wherein the second project is used for managing a plurality of pre-developed products, and each product of the plurality of pre-developed products provides a different type of service function separately;

associate a target product with the second project and create a binding batch on the first server, to enable the first server to apply for the identity authentication information for the Internet of Things device, wherein the target product is applied to the Internet of Things device, and the binding batch is used for association with a device identifier of the Internet of Things device;

receive the request message from the Internet of Things device;

acquire the identity authentication information from the second server in place of the Internet of Things device;

manage the identity authentication information; and return the identity authentication information to the Internet of Things device in response to the request message; and the second server is configured to: provide a target cloud service corresponding to the identity authentication information.

14. The system for acquiring identity authentication information according to claim 13, wherein the first server is further configured to:

create a first project, wherein the first project is used for managing a plurality of Internet of Things devices;

add the device identifier of the Internet of Things device in the first project, and generate connection information corresponding to the device identifier, wherein the connection information is used for establishing a connection between the Internet of Things device and the first server; and write the connection information into the Internet of Things device, to enable the Internet of Things device to establish a connection with the first server by using the connection information.

15. The system for acquiring identity authentication information according to claim 14, wherein the connection information comprises identifier information, private key information and public key information, wherein the identifier information is an identifier applied for by the Internet of Things device, and a combination of the private key information and the public key information is used for encrypting data transmitted between the Internet of Things device and the first server.

\* \* \* \* \*